(12) United States Patent
Lovlekar et al.

(10) Patent No.: US 11,722,250 B2
(45) Date of Patent: Aug. 8, 2023

(54) UPLINK REPETITION ENHANCEMENT

(71) Applicant: Apple Inc., Cupertino, CA (US)

(72) Inventors: Srirang A. Lovlekar, Cupertino, CA (US); Murtaza A. Shikari, Mountain View, CA (US); Fangli Xu, Beijing (CN); Haijing Hu, Beijing (CN); Longda Xing, San Jose, CA (US); Dawei Zhang, Saratoga, CA (US); Sethuraman Gurumoorthy, San Jose, CA (US); Sree Ram Kodali, Sunnyvale, CA (US); Srinivasan Nimmala, San Jose, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 16/849,761

(22) Filed: Apr. 15, 2020

(65) Prior Publication Data

US 2021/0014002 A1 Jan. 14, 2021

(30) Foreign Application Priority Data

Jul. 10, 2019 (CN) .......................... 201910619137.8

(51) Int. Cl.
*H04L 1/08* (2006.01)
*H04L 1/00* (2006.01)
*H04W 72/20* (2023.01)
*H04W 72/542* (2023.01)

(52) U.S. Cl.
CPC .............. *H04L 1/08* (2013.01); *H04L 1/0033* (2013.01); *H04W 72/20* (2023.01); *H04W 72/542* (2023.01)

(58) Field of Classification Search
None
See application file for complete search history.

(56) References Cited

U.S. PATENT DOCUMENTS

| | | | |
|---|---|---|---|
| 10,575,299 B2 | 2/2020 | Ying | |
| 10,582,418 B2 | 3/2020 | Tsai | |
| 2008/0285501 A1* | 11/2008 | Zhang | H04W 8/04 370/315 |
| 2018/0103419 A1 | 4/2018 | Lee | |
| 2018/0124705 A1* | 5/2018 | Su | H04W 52/0277 |
| 2018/0309496 A1 | 10/2018 | Lee | |
| 2019/0036647 A1* | 1/2019 | Gowda | H04W 52/0229 |

(Continued)

FOREIGN PATENT DOCUMENTS

WO    WO 2020/050843 A1    3/2020

*Primary Examiner* — Kenny S Lin
*Assistant Examiner* — Rodrick Mak
(74) *Attorney, Agent, or Firm* — Kowert, Hood, Munyon, Rankin & Goetzel, P.C.; Jeffrey C. Hood

(57) ABSTRACT

Apparatuses, systems, and methods for a wireless device to perform methods for enhancing uplink (UL) repetitions for an associated transport block. A user equipment device (UE) may be configured to transmit an indication of cancellation of remaining UL repetitions to a network, e.g., to a network entity, such as a base station, e.g., based, at least in part, on monitored channel conditions. Additionally, a network, e.g., a network entity such as a base station, may be configured to transmit an indication of cancellation of remaining UL repetitions to a UE, e.g., based on successful reception of the associated transport block.

20 Claims, 11 Drawing Sheets

(56) References Cited

U.S. PATENT DOCUMENTS

| | | |
|---|---|---|
| 2019/0363843 A1* | 11/2019 | Gordaychik .......... H04L 1/1854 |
| 2020/0015206 A1 | 1/2020 | Lee |
| 2020/0053730 A1 | 2/2020 | Hosseini |
| 2020/0053778 A1 | 2/2020 | Babaei |
| 2020/0053799 A1 | 2/2020 | Jeon |
| 2020/0059322 A1 | 2/2020 | Lei |
| 2020/0100272 A1 | 3/2020 | Takeda |
| 2020/0146034 A1* | 5/2020 | Bagheri .................... H04L 1/08 |
| 2020/0221474 A1* | 7/2020 | Lee ......................... H04L 1/189 |
| 2020/0287668 A1* | 9/2020 | Shi ........................ H04L 5/0053 |

* cited by examiner

UPLINK REPETITION ENHANCEMENT

PRIORITY DATA

This application claims benefit of priority to Chinese Patent Application Serial No. 201910619137.8, titled "Uplink Repetition Enhancement", filed Jul. 10, 2019, which is hereby incorporated by reference in its entirety as though fully and completely set forth herein.

FIELD

The present application relates to wireless devices, and more particularly to apparatuses, systems, and methods for enhancing uplink repetitions within a cellular access network.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to apparatuses, systems, and methods for enhancing uplink (UL) repetitions of an associated transport block for a wireless device operating in an access network. In some embodiments, a wireless device, e.g., such as a user equipment device (UE), may be configured to transmit an indication of cancellation of remaining UL repetitions to a network, e.g., to a network entity, such as a base station. In some embodiments, a network, e.g., a network entity such as a base station, may be configured to transmit an indication of cancellation of remaining UL repetitions to a UE.

In some embodiments, a user equipment device (UE) may be configured to perform methods for enhancing UL repetitions, including receiving, from a network (e.g., from a network entity such as a base station), an UL repetition configuration associated with a transport block and transmitting, to the network, at least a first portion (e.g., at least one UL repetition and/or one or more UL repetitions) of UL repetitions while monitoring UL channel quality. In some embodiments, the UL repetition configuration may specify a number of UL repetitions (e.g., an UL repetition bundle) required (and/or mandated by the network) for (successful) transmission of the transport block. The UE may transmit, to the network, an indication that the UE will not transmit additional UL repetitions after transmission of the first portion of UL repetitions. In some embodiments, the first partition of UL repetitions may not complete the number of UL repetitions required for (successful) transmission of the transport block (e.g., the UE may not complete the UL repetition bundle) and the indication that the UE will not transmit additional UL repetitions may be based, at least in part, on the monitored channel quality. In some embodiments, the UL repetition configuration may include an UL block error rate (BLER) target and the indication that the UE will not transmit additional UL repetitions may be based on monitored UL BLER being less than the BLER target (e.g., the network may notify the UE that the UL BLER is less than the UL BLER target).

In some embodiments, a base station (or network entity) may be configured to perform methods for enhancing UL repetitions, including transmitting, to UE, an UL repetition configuration associated with a transport block and receiving, from the UE, at least a first portion (e.g., at least one UL repetition and/or one or more UL repetitions) of the UL repetitions. In some embodiments, the UL repetition configuration may specify a number of UL repetitions (e.g., an UL repetition bundle) required for (successful) transmission of the transport block. The base station may determine, after reception of at least the first portion of UL repetitions, that the transport block has been successfully received and transmit, to the UE and based at least in part on determining that the transport block has been successfully received, an indication cancelling remaining UL repetitions. In some embodiments, the indication may include at least one of a new grant, a cancellation downlink control information (DCI) message/signal, or an acknowledgement transmitted on a physical hybrid automatic repeat request indicator channel (PHICH). In some embodiments, the UE may be configured to operate in a coverage enhanced (CE) mode of operation. In some embodiments, the new grant may include a new data indicator (NDI) with a value of 1. In some embodiments, the cancellation DCI message/signal may include an indication of the cancellation of the remaining UL repetitions.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
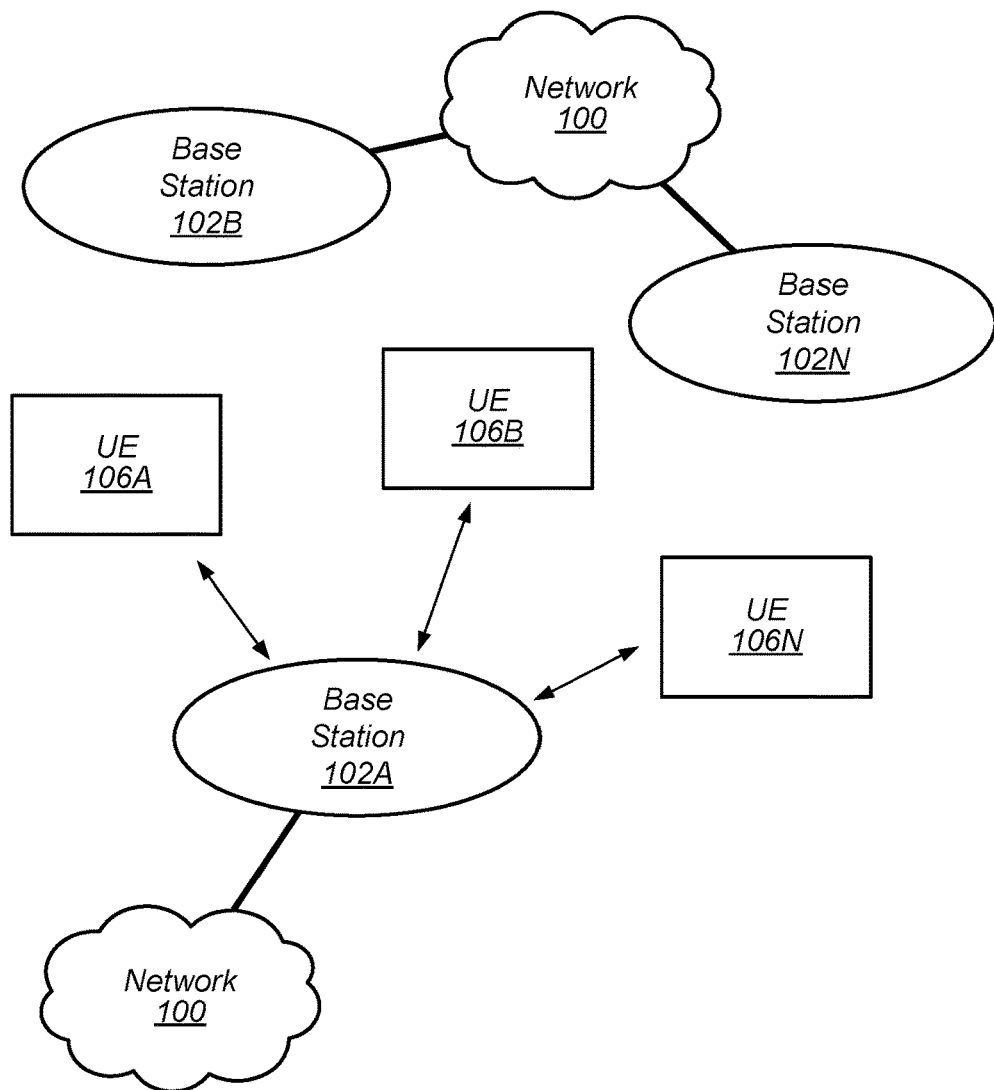
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
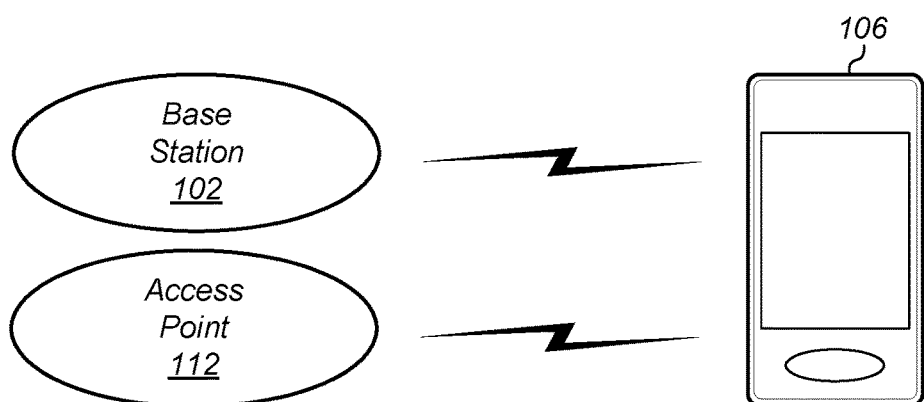
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
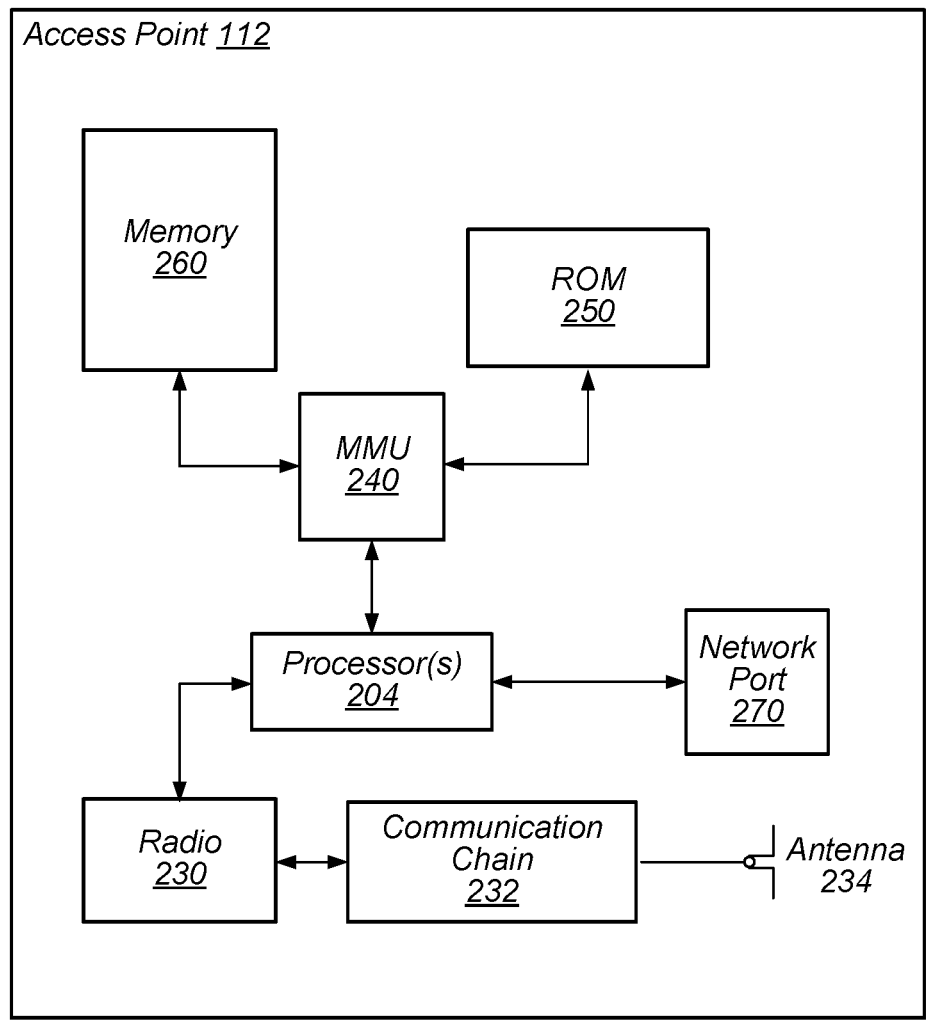
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for enhancing UL repetitions as further described herein.

Figure 3:
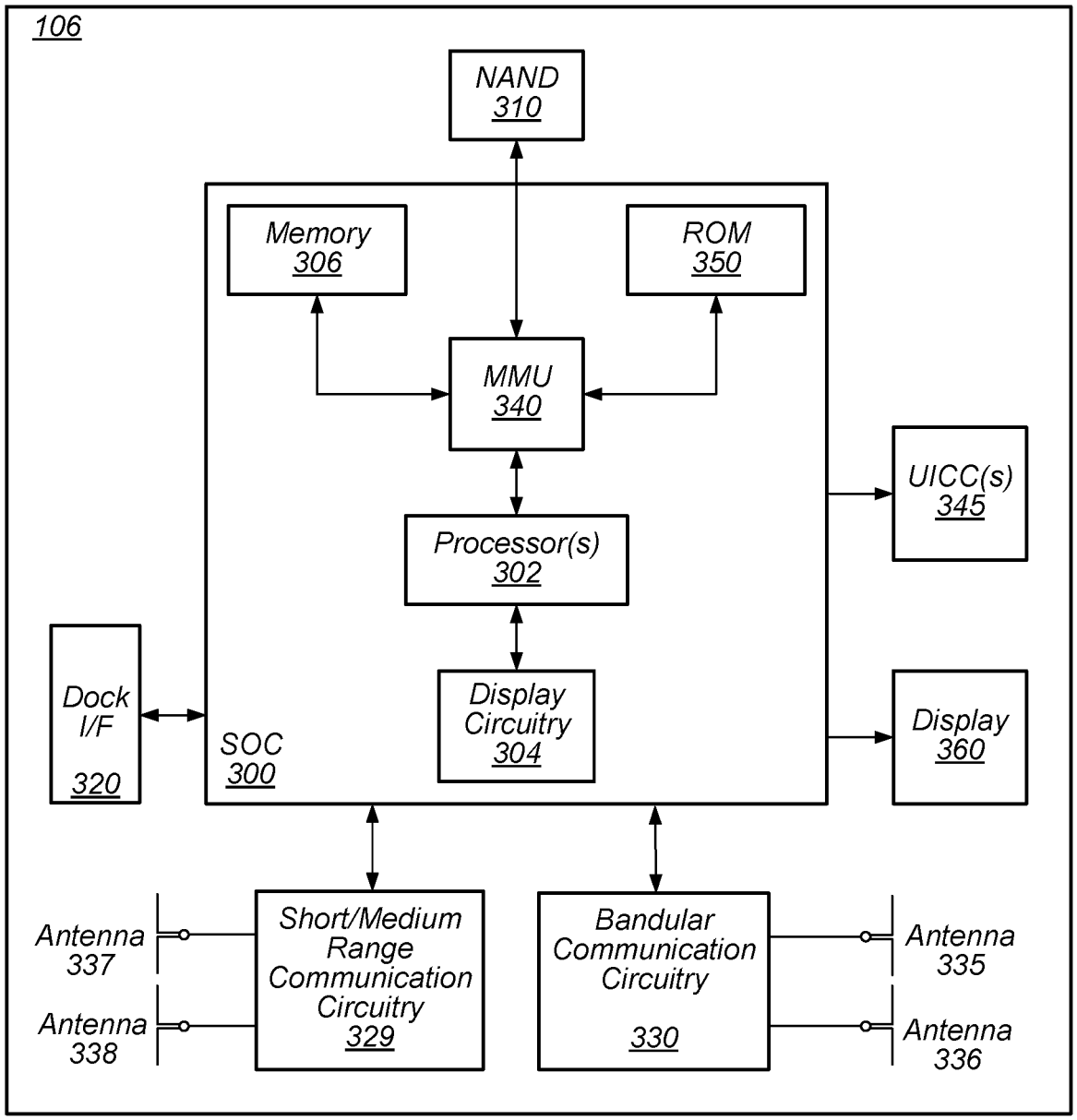
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for enhancing UL repetitions as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
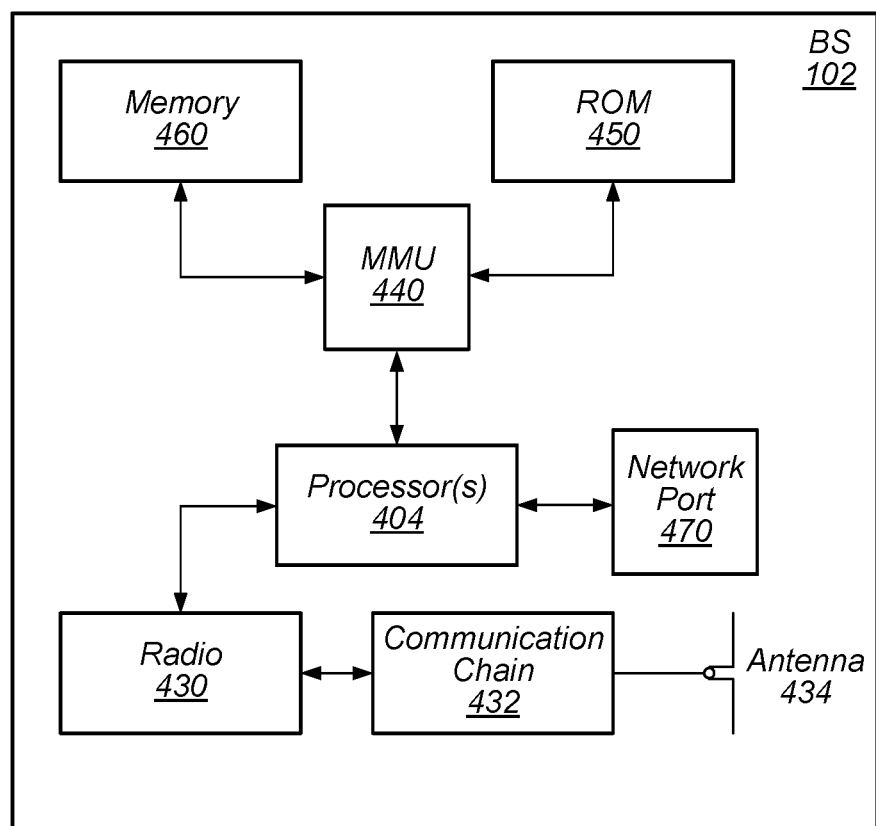
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
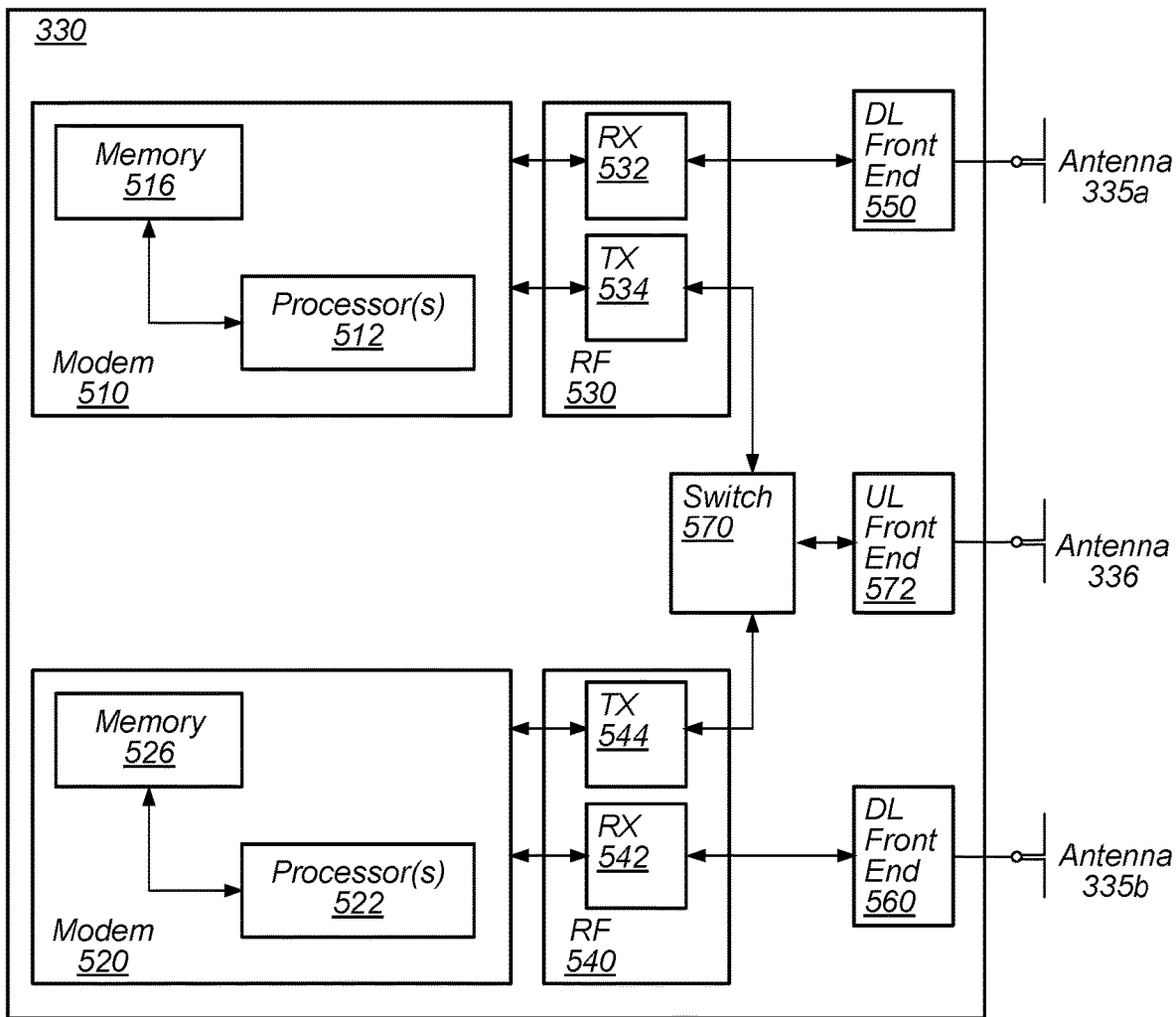
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for enhancing UL repetitions as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
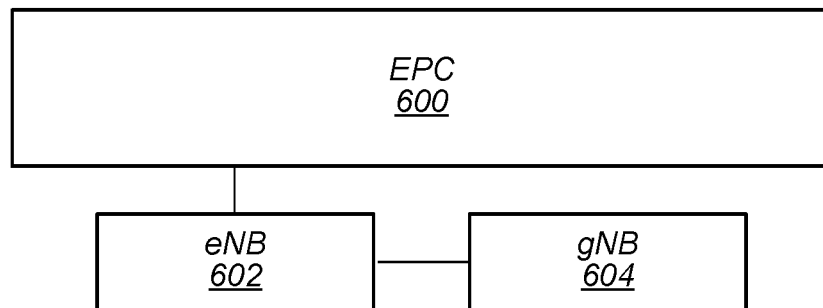
FIG. 6A illustrates an example of connections between an EPC network, an LTE base station (eNB), and a 5G NR base station (gNB).
Figure 6B:
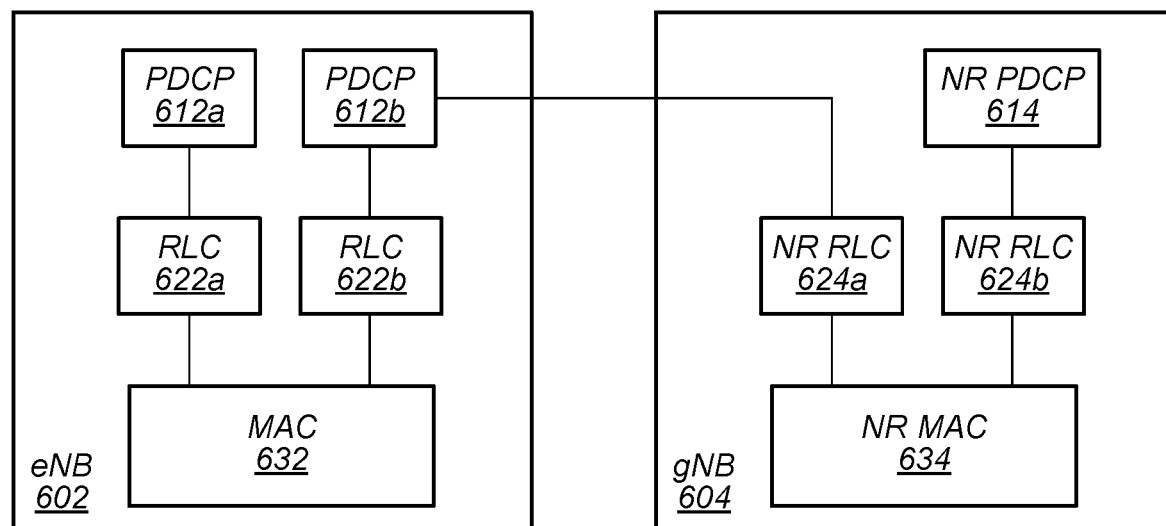
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
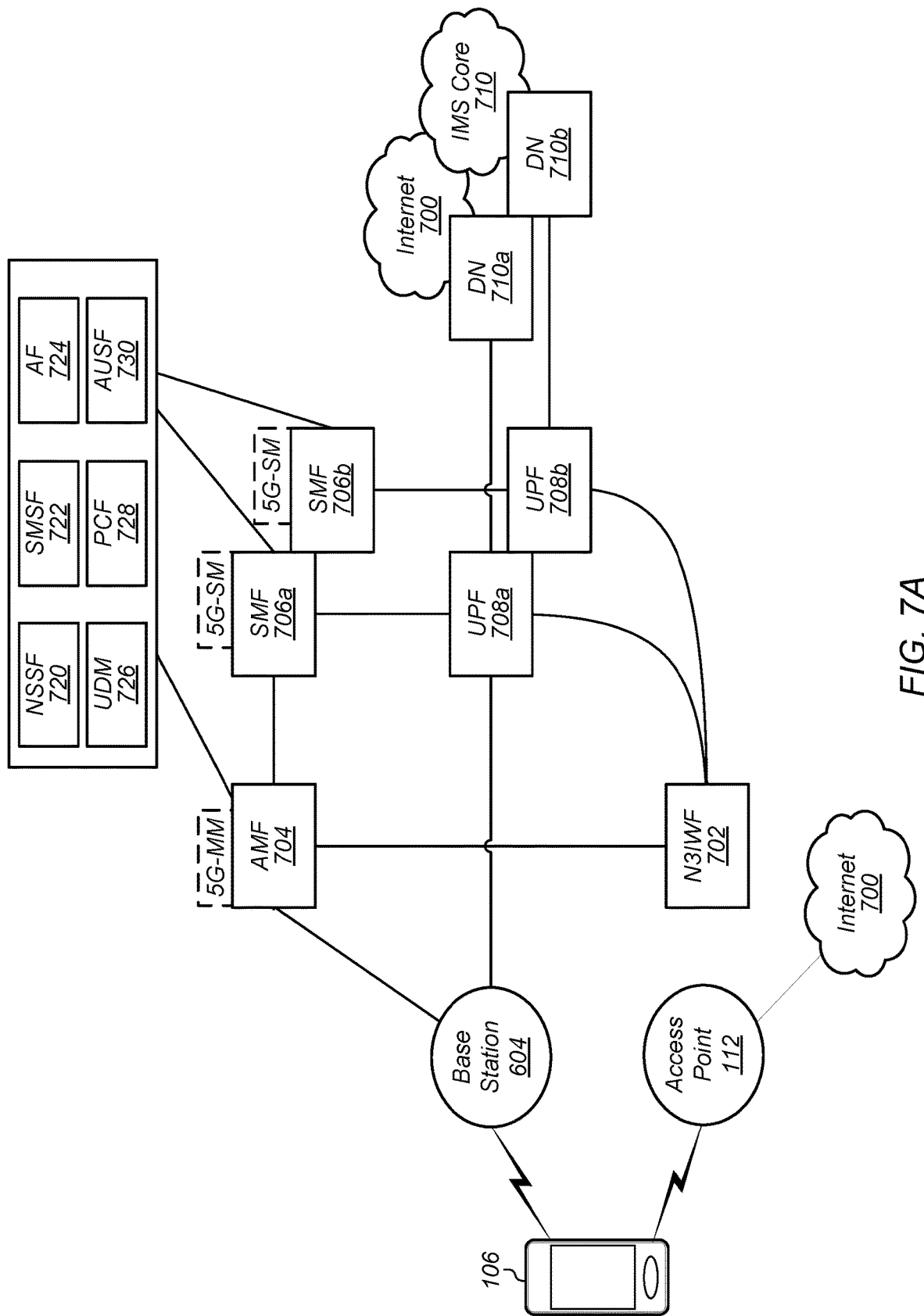
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
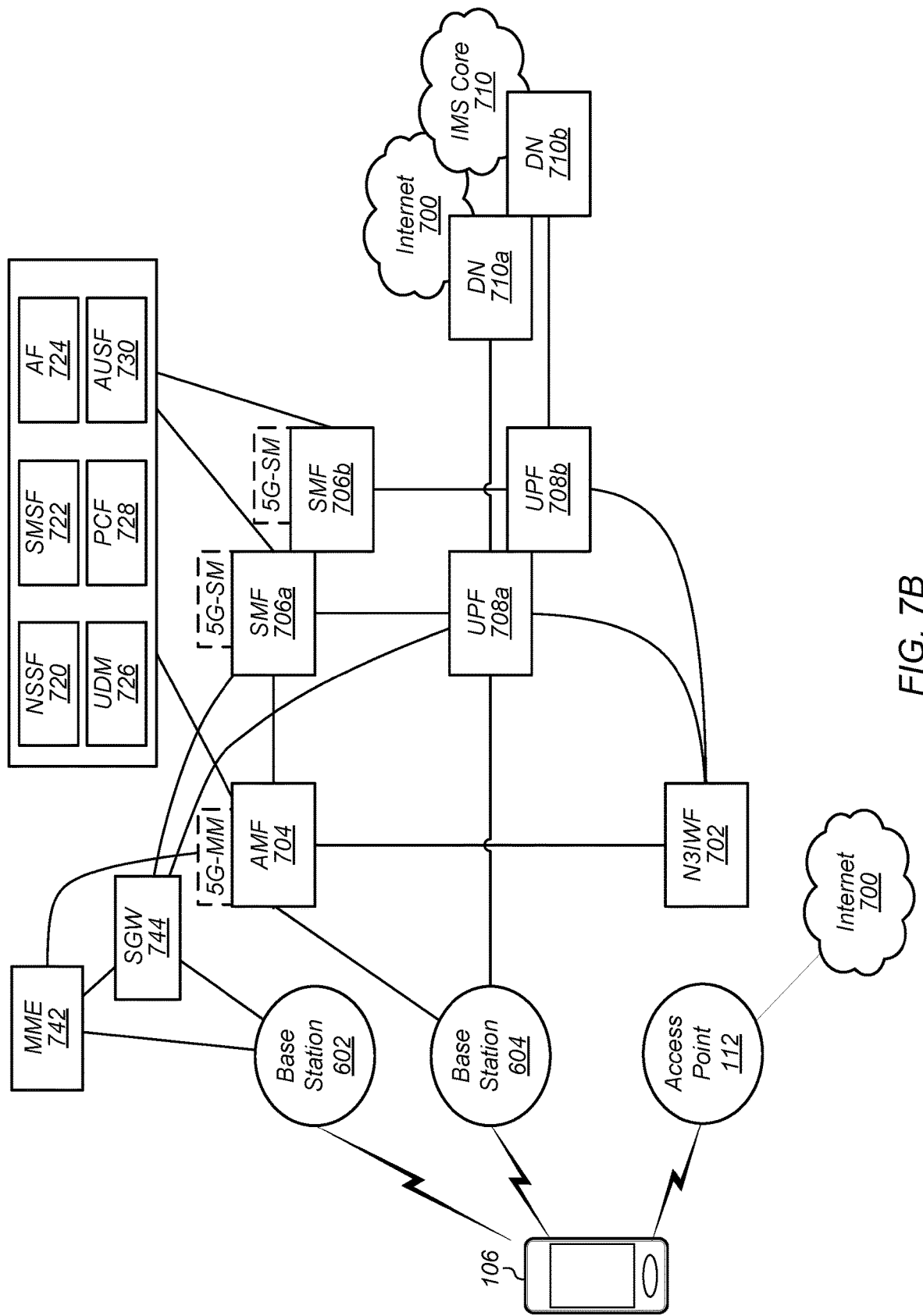
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710*a* and 710*b*) and/or the Internet 700 and IMS core network 710.

Note that in various embodiments, one or more of the above described network entities may be configured to perform methods to improve security checks in a 5G NR network, including mechanisms for enhancing UL repetitions, e.g., as further described herein.

Figure 8:
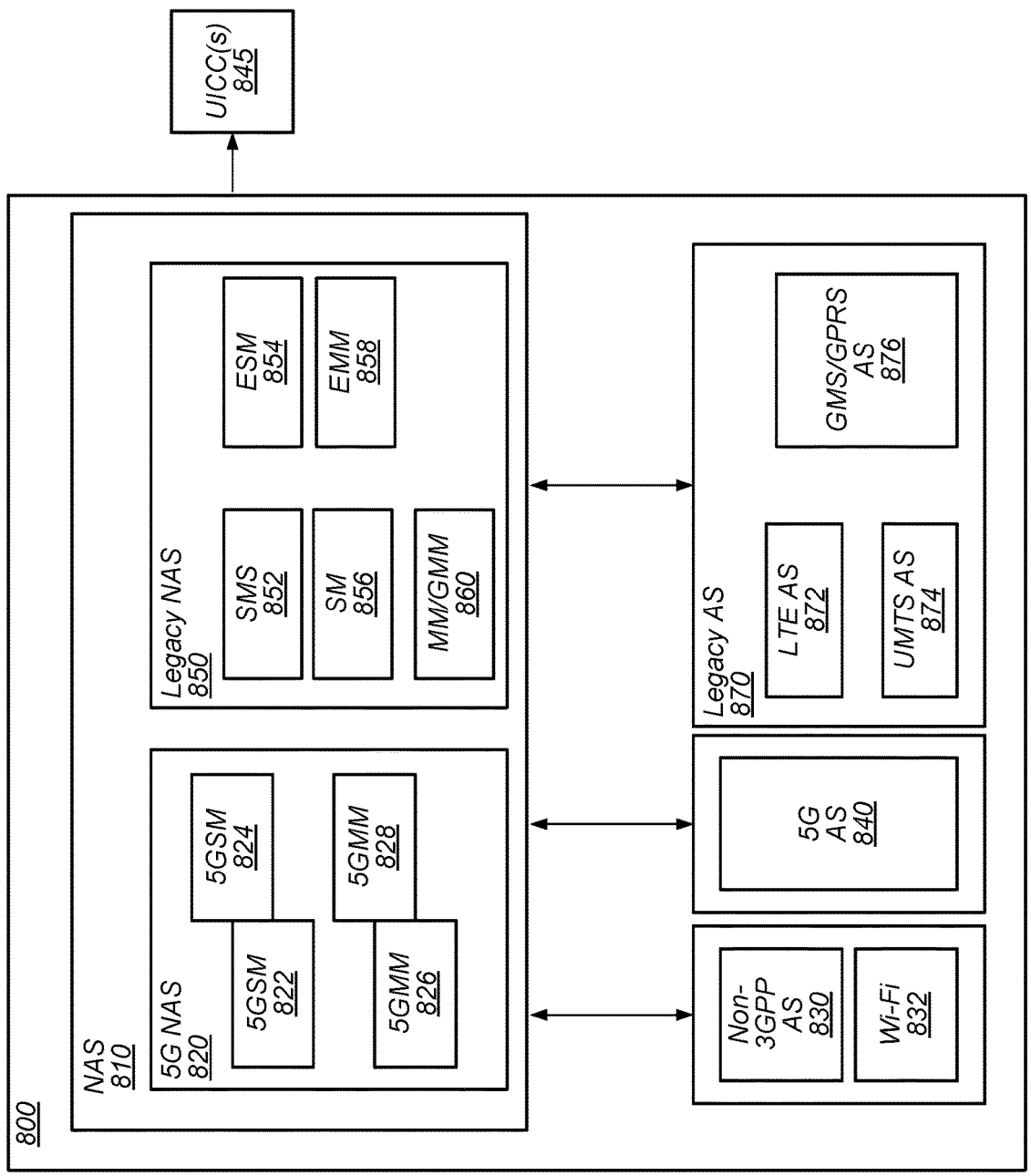
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for enhancing UL repetitions, e.g., as further described herein.

Bandwidth Limited/Coverage Enhancement Mode

In existing implementations, mobile devices may be categorized as BL/CE devices or as non-BL/CE devices. A BL device may be characterized (or defined as) a bandwidth reduced low complexity device implementing LTE-M1. Similarly, a CE device may be characterized (or defined as) a coverage enhancement device implementing LTE-M1. LTE-M1 is a design/implementation of LTE to meet machine type communication (MTC) criteria, including low throughput, low cost, and low energy consumption. Such designs/implementations may include:

(1) use of a narrow bandwidth, such as 1.4 Mhz bandwidth;

(2) operation in half-duplex mode;

(3) limited (or reduced) maximum transmission power;

(4) operation with legacy LTE (e.g., non-LTE-M1) using wider system bandwidths such as 10 Mhz or 20 Mhz;

(5) division of legacy LTE system bandwidth into multiple sections of 1.4 Mhz and use of any one of those sections;

(6) omission of (or avoidance of use of) PCFICH (physical control format indicator channel), PHICH (physical hybrid-ARQ indicator channel), PDCCH (physical downlink control channel);

(7) specifically designed control channel called MPDCCH (MTC physical downlink control channel);

(8) different subframes (e.g., cross-subframe scheduling) for MPDCCH and corresponding PDSCH (e.g., the PDSCH (physical downlink shared channel) scheduled by the MPDCCH);

(9) specific DCI formats such as 6-0A, 6-0B, 6-1A, 6-1B, and/or 6-2;

(10) transmission of PBCH (physical broadcast channel), PRACH (physical random access channel), MPDCCH, PDSCH, PUCCH (physical uplink control channel), PUSCH (physical uplink shared channel) in repeating fashion (e.g., to allow these channels to be decodable even when signal quality/power is very poor);

(11) support of a limited number of transmission modes such as transmission modes 1, 2, 6, and/or 9 which can operate in single layer;

(12) PDSCH scheduling (DCI) and transmission scheduled in different subframe (e.g., cross-subframe scheduling);

(13) utilization of a physical channel format that may transmit SIB/RAR/Paging in repetitive mode without using control channel, resource allocation information (subframe, TBS, sub-band index) for SIM decoding may be determined by a MIB parameter (e.g., no control channel is used);

(14) resource allocation information (subframe, TBS, sub-band Index) for SIB2 decoding may be determined from several SIB1 parameters (e.g., no control channel is used); and/or

(15) support of an extended paging (DRX) cycle.

In some implementations, a BL/CE device may operate in at least two different operating modes—CE mode A and CE mode B. The operating mode may be specified for an RRC connected state and configured by the network. The CE mode may be dependent upon a CE level, with CE mode A being associated with levels 1 and 2 and CE mode B being associated with levels 3 and 4. Levels may differ in random access channel (RACH) and paging processes with level 1 associated with a least amount of repetition for PRACH and level 4 being associate with a largest amount of repetition for PRACH. A wireless device may determine a level based on reference signal power (RSRP) measurement and may inform the network via PRACH resource usage.

UL Repetition Enhancement

As noted above, in some existing implementations, a number of uplink (UL) repetitions (e.g., an UL repletion bundle) may be configured by a network via RRC signaling messages and, once configured, a wireless device may be required to transmit each repetition (as configured by the network) on PUCCH and PUSCH irrespective of whether all repetitions are necessary. In some implementations, the number of UL repetitions for CE modes A and B may be signaled via parameters such as pucchNumRepetitionsCE, puschMaxNumRepetitionsCEModeA, and puschMaxNumRepetitionCEModeB. Additionally, a PUSCH enhancement mode for wireless devices in non-CE mode for MINITEL (multimedia telephony over IMS, e.g., to provide VoLTE) voice quality and coverage enhancements may be specified in which the network may configure PUSCH subframe repetition with intra-bundle (within a sub-frame) or inter-bundle (across sub-frames) frequency hopping. For some implementations, CE mode A may be a preferred mode of operation for wearable devices (or more generally, wireless devices) with low data transfers (e.g., even if the wearable device is in a good coverage area), mostly because of narrow bandwidth operation which allows the wearable to save power. However, repetitions in CE mode A may reduce power savings due to the narrow bandwidth operation because:

(1) a network may adapt a number of repetitions based on the link quality (e.g., based on BLER (block error rate), CQI (channel quality index), and so forth;

(2) a high number of repetitions configured for the wearable device in good channel conditions may lead to excess retransmissions from the wearable device, thereby consuming excess power;

(3) a wearable device cannot stop (or avoid) UL repetitions because network might treat the non-transmission of the mandated/configured UL repetitions as BLER and in turn increase the number of repetitions costing the wearable device even more power (e.g., the network may penalize the wearable device if the wearable device does not complete all of the mandated/configured UL repetitions).

Thus, the wearable device may be required to fulfill the mandated/configured number of UL repetitions specified by the network even if the network has received the transport block successfully in the first or earlier transmission/repetition. Otherwise, the wearable device may be penalized by the network, e.g., missed UL repetitions may impact UL BLER leading to the network incorrectly adjusting allocations to the wearable device, e.g., the network may determine that radio conditions are worse than actual based on the wearable device not transmitting all of the mandated/configured UL repetitions.

In some implementations, a network may specify an initial UL repetition number as n1. However, if UL and/or DL BLER (which may be combined with channel quality index (CQI) as well as other channel measurement information) is higher than a target (e.g., channel conditions are worsening and/or worse than expected/anticipated), the network may decrease a modulation and coding scheme (MCS) value. Further, if UL and/or DL BLER targets are not met via reduction of the MCS value (e.g., MCS value is low and/or near 0), the network may then increase the number of mandated/configured UL repetitions. In some implementations, as radio link conditions improve (e.g., UL and/or DL BLER is lower than target), the network may decrease the number of mandated/configured UL repetitions first and then increase the MCS value. In some implementations, the network may dynamically schedule the mandated/configured UL repetition number for PUCCH and PUSCH transmissions according to the current UE radio quality and DL and/or UL BLER.

Embodiments described herein provide mechanisms for a network (or network entity such as base station 102) and/or a UE (such as UE 106) to enhance a number of UL repetitions the UE may be required to transmit for a transport block. In some embodiments, the network may transmit an (explicit) indication to a UE to indicate that the transport block has been received, thereby cancelling remaining UL repetitions. In some embodiments, a UE may add an indicator in an intermediate UL repetition transmission indicating that the intermediate UL repetition transmission will be the last UL repetition transmission for the data block, thereby cancelling remaining UL repetitions. In some embodiments, the UE may transmit an indication to the network that no further UL repetitions will be transmitted for the data block, thereby cancelling remaining UL repetitions, e.g., based on a condition (which may be network specified) occurring and/or obtaining. In some embodiments, the UE may be a CE mode UE and/or a UE operating in a CE mode. In other embodiments, the UE may be a non-CE mode UE and/or a UE not operating in a CE mode. Thus, embodiments described herein provide mechanisms for the network and the UE to monitor and determine an optimum number of UL repetitions without impacting UL BLER.

In some embodiments, an (explicit) indication may be received, by a UE, such as UE 106, from a network (e.g., from a base station such as base station 102) to cancel an uplink (UL) repetition. In some embodiments, a feedback mechanism may be implemented to allow a base station to inform the UE that no repetitions (or no further repetitions) are necessary for a transport block that has been received successfully prior to an entire uplink bundle (e.g., an entire set of UL repetitions as specified by the network) being transmitted by the UE. In some embodiments, the network may schedule a new grant with a new data indicator (NDI) set to "1" prior to the completion of the UL repetitions. In some embodiments, the network may transmit a cancellation DCI message/signal (e.g., a downlink control information message/signal that includes an indication of cancellation of remaining UL repetitions) that may allow the UE to cancel a remaining portion of UL repetitions. In some embodiments, a PHICH may be added to CE mode to allow the network to transmit an immediate hybrid automatic repeat request (HARD) acknowledgement (ACK) for an intermediate transmission of the UL repetition, thereby providing the UE with an (explicit) indication to cancel remaining UL repetitions.

In some embodiments, the feedback scheme may include the network transmitting a new grant (e.g., via toggling of NDI) implicitly indicating to the UE that the UL transport block has been received. In some embodiments, the fast feedback scheme may (also or alternatively) include the network transmitting a cancellation DCI message/signal to cancel UL repetitions prior to completion of the UL repetition bundle. In some embodiments, the network may decide whether to transmit a new grant/cancellation DCI message/signal based, at least in part, on a number of configured UL repetitions. For example, if a number of repetitions is set to a relatively small number (e.g., such as 2, 4, 8, 16, or 32), then the network may decide not to transmit a new grant/cancellation DCI message/signal. However, if a number of repetitions is set to a relatively large number (e.g., such as 128, 256, 512, or 1028), then the network may decide to transmit a new grant/cancellation DCI message/signal when a transport block is successfully received. In some embodiments, whether the new grant/cancellation DCI message/signal is transmitted may be dependent on a number of remaining UL repetitions in the UL repetition bundle, e.g., if less than a specified percentage of UL repetitions are remaining, the network may not transmit the new grant/cancellation DCI message/signal; conversely if more than a specified percentage of UL repetitions are remaining, the network may transmit the new grant/cancellation DCI message/signal. In some embodiments, the specified percentage may be dynamically configurable by the network, e.g., based on various factors such as UL radio conditions, network load, and so forth. In some embodiments, upon receiving the new grant/cancellation DCI message/signal, the UE may stop (or cancel remaining) UL repetitions for the associated transport block and schedule transmission of a new transport block/protocol data unit (PDU) in the uplink.

In some embodiments, the network may additionally (or alternatively) monitor BLER and CSI. In some embodiments, the network may average BLER and channel state reports from a UE, such as UE 106, over a monitoring window (or period of time) to determine an optional UL repetition count to be configured. In some embodiments, if/when BLER is below a threshold and channel conditions are better than a threshold over the monitoring window, the network may reduce the optional UL repetition count and the UE may update a number of UL repetitions accordingly and vice-versa.

Figure 9:
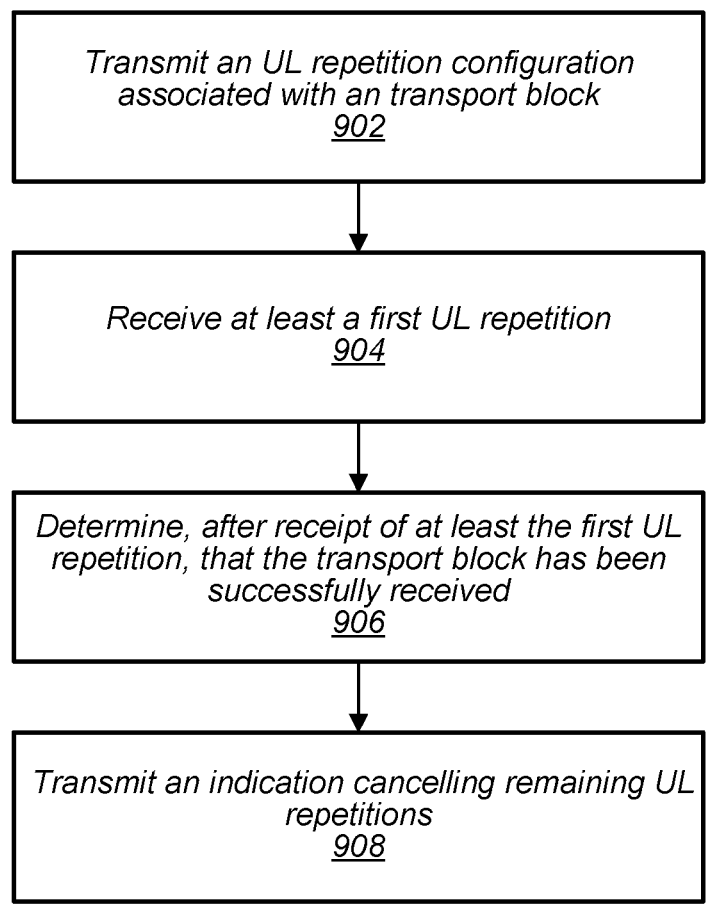
FIG. 9 illustrates a block diagram of an example of a method for enhancement of UL repetitions for an associated transport block, according to some embodiments.

FIG. 9 illustrates a block diagram of an example of a method for enhancement of UL repetitions for an associated transport block, according to some embodiments. The method shown in FIG. 9 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 902, an uplink (UL) repetition configuration may be transmitted by a network (e.g., from a network entity, such as base station 102) to a UE, such as UE 106. In some embodiments, the UL repetition configuration may be associated with a transport block and/or a packet data unit (PDU) being transmitted from the UE to the network. In some embodiments, the transport block/PDU may be associated with an UL scheduling grant allocated by the network to the UE. In some embodiments, the UL repetition configuration may be transmitted via a radio resource control (RRC) message. In some embodiments, the UL configuration may specify a number of UL repetitions required for transmission of the transport block/PDU. In some embodiments, the number of UL repetitions may be based on one or more of an operating mode of the UE (e.g., CE mode A or CE mode B) and/or UL channel conditions (such as block error rate (BLER)), among other factors. In some embodiments, the UL configuration may include a UL BLER target (or threshold). In some embodiments, the UL BLER target may include HARQ BLER, RLC BLER, and/or both HARQ BLER and RLC BLER. The UL BLER target may be specified such that when measured UL BLER is less than the UL BLER target, there may be a high (or higher) probability of successful transmission of the transport block/PDU prior to transmission of all UL repetitions as specified in the UL repetition configuration.

At 904, at least a first portion of UL repetitions may be received by the network from the UE. In some embodiments, the first portion may include one or more UL repetitions. In other words, in some embodiments, the first portion may include a single UL repetition and/or multiple UL repetitions. In some embodiments, the UE may monitor UL channel quality while transmitting (or during transmission of) the first portion of UL repetitions. In other words, the UL repetition configuration may specify the number of required (or mandated) UL repetitions and the UE may transmit at least a portion (e.g., one or more) of the UL repetitions while monitoring UL channel quality/UL channel conditions. In some embodiments, the UE may be configured and/or signaled via a downlink (DL) MAC control element (CE) or DL DCI with a minimum number of UL (re) transmissions (e.g., UL repetitions) that the UE should transmit. In such embodiments, the UE may repeat the UL transmissions accordingly and may adjust an upper bound of UL transmissions according to other conditions, e.g., as described herein. In some embodiments, the UE may be configured with different values of minimum and/or maximum UL repetitions (or re-transmissions), e.g., depending on an MCS value. For example, for MCS values of 0-10, the UE may be configured to use a minimum of 4 UL repetitions (retransmissions) and a maximum of 16 UL repetitions (retransmissions). As another example, for MCS values of 11-20, the UE may be configured to use a minimum of 8 UL repetitions (retransmissions) and a maximum of 32 UL repetitions (retransmissions). Note that these examples are exemplary only and other minimum and maximum values of UL repetitions may be used.

At 906, the network may determine, after reception of at least the first portion of UL repetitions, that the transport block/PDU has been successfully received. In other words, the network may successfully receive the transport block/PDU prior to transmission of all the UL repetitions specified in the UL repetition configuration. In some embodiments, the network may determine a number of remaining UL repetitions. In such embodiments, the network may compare the number of remaining UL repetitions to a first threshold and base transmission of an (explicit) indication cancelling remaining UL repetitions on the number of remaining UL repetitions exceeding the first threshold. In some embodiments, the first threshold may be specified based on a percentage of UL repetitions.

At 908, the network may transmit, based on successfully receiving the transport block/PDU, an (explicit) indication to the UE that indicates cancellation of remaining UL repetitions. In some embodiments, responsive to receiving the indication, the UE may cancel the remaining UL repetitions, include the second UL repetition. In some embodiments, the indication may include (or be) at least one of a new grant, a cancellation downlink control information (DCI) message/signal, or an acknowledgement transmitted on a physical hybrid-automatic repeat request indicator channel (PHICH). In some embodiments, the UE may be configured to operate in a coverage enhanced (CE) mode of operation. In some embodiments, the new grant may include a new data indicator (NDI) with a value of 1. In some embodiments, the cancellation DCI message/signal may include an indication of the cancellation of the remaining UL repetitions.

In some embodiments, the network may monitor channel conditions for at least a first time period. In such embodiments, the network may reduce, based on the channel conditions, the number of UL repetitions required for transmission of the transport block. The network may transmit, to the UE, a new UL repetition configuration specifying the reduced number of UL repetitions. In some embodiments, monitoring channel conditions may include monitoring UL block error rate (BLER).

In some embodiments, the network may receive, prior to transmission of the indication cancelling remaining UL repetitions, a second UL repetition and an indication that further (or additional) UL repetitions will not be transmitted from the UE. In some embodiments, the second UL repetition may not complete the number of UL repetitions required (e.g., specified by the network) for transmission of the transport block/PDU. In other words, the UE may cancel remaining UL repetition transmissions. In some embodiments, the indication that the UE will not transmit additional UL repetitions may be based, at least in part, on monitored channel quality. In some embodiments, the UE may determine, during transmission of the at least first portion of UL repetitions and prior to transmission of the second UL repetition, that monitored UL BLER is less than a BLER target specified in the UL repetition configuration. In such embodiments, the indication may be based on such a condition occurring and/or obtaining. In some embodiments, monitoring UL channel quality may include (or also include) monitoring one or more of UL block error rate (BLER), signal to noise ratio (SNR), or radio resource management (RRM) measurement quality. In some embodiments, the second UL repetition may include the indication that the UE will not transmit additional UL repetitions. In such embodiments, the indication may include (or be) a Boolean indicator. In some embodiments, the indication that the UE will not transmit additional UL repetitions may be included in an uplink control information (UCI) message/signal. In some embodiments, un-transmitted UL repetitions may not be included in an UL BLER calculation.

In some embodiments, a conditional UL repetition may be transmitted by a UE, such as UE 106, to the network based, at least in part, on a network configured BLER target. In some embodiments, a UE may be allowed to skip (not transmit) UL repetition transmissions without the network treating skipped (not transmitted) UL repetition transmissions as BLER. In other words, in some embodiments, a UE may not be penalized by the network for skipping UL repetition transmissions. In some embodiments, a UE may determine to add an indicator in an intermediate UL repetition transmission of the UL repetition bundle indicating that the intermediate UL repetition transmission will be the last UL repetition transmission of the UL repetition bundle. In some embodiments, the UE may (alternatively) indicate an UL repetition transmission number in an uplink control information (UCI) message/signal in the UL repetition transmission. In some embodiments, the UE may perform early termination of UL repetition bundle transmissions based, at least in part, on radio resource management (RRM) measurement quality, channel quality (e.g., signal to noise ratio (SNR), and/or UL BLER, among other channel quality measurements.

In some embodiments, the network may configure a target BLER for the UE. In such embodiments, if a current BLER is less than the target BLER, the UE may decide (determine) to skip (not transmit) at least a portion of the UL repetition bundle irrespective of the network configuring a number of UL repetition transmissions in the UL repetition bundle via grant scheduling. Advantages of such a scheme may include:

(1) the network not having to transmit a cancellation DCI message/signal each time the UE performs early UL repetition termination, thereby saving the UL grant; and (2) the UE may adapt number of UL repetitions rapidly without dependence on the network to update the number of UL repetitions, thereby resulting in reduced power consumption for the UE when UL repetitions can be reduced due to low UL BLER.

Figure 10:
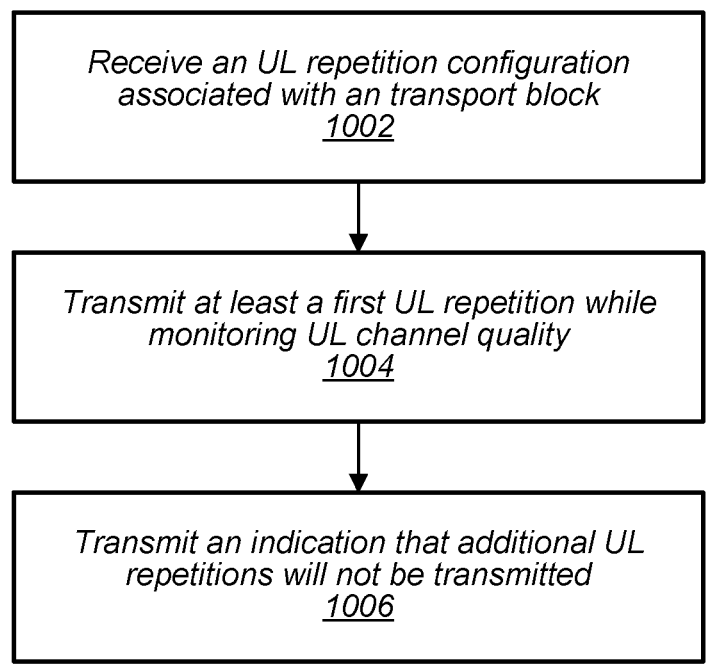
FIG. 10 illustrates a block diagram of another example of a method for enhancement of UL repetitions for an associated transport block, according to some embodiments.

FIG. 10 illustrates a block diagram of another example of a method for enhancement of UL repetitions for an associated transport block, according to some embodiments. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, an uplink (UL) repetition configuration may be received by a UE, such as UE 106, from a network (e.g., from a network entity, such as base station 102). In some embodiments, the UL repetition configuration may be associated with a transport block and/or a packet data unit (PDU) being transmitted from the UE to the network. In some embodiments, the transport block/PDU may be associated with an UL scheduling grant allocated by the network to the UE. In some embodiments, the UL repetition configuration may be received via a radio resource control (RRC) message. In some embodiments, the UL configuration may specify a number of UL repetitions required for transmission of the transport block/PDU. In some embodiments, the number of UL repetitions may be based on one or more of an operating mode of the UE (e.g., CE mode A, CE mode B, and/or non-CE mode) and/or UL channel conditions (such as block error rate (BLER)), among other factors. In some embodiments, the UL configuration may include a cancellation condition, e.g., such as UL BLER target (or threshold). The UL BLER target may be specified such that when measured UL BLER is less than the UL BLER target, there may be a high (or higher) probability of successful transmission of the transport block/PDU prior to transmission of all UL repetitions as specified in the UL repetition configuration.

At 1004, at least a first portion (e.g., at least one UL repetition and/or one or more UL repetitions) of UL repetitions may be transmitted from the UE to the network. In some embodiments, the UE may monitor UL channel quality while transmitting (or during transmission of) the first portion of UL repetitions. In other words, the UL repetition configuration may specify the number of required UL repetitions for successful transmission of the transport block and the UE may transmit at least a portion of the UL repetitions while monitoring UL channel quality/UL channel conditions.

At 1006, an indication that further (or additional) UL repetitions will not be transmitted may be transmitted by the UE to the network. In some embodiments, the first portion of UL repetitions may not complete the number of UL repetitions required (e.g., specified by the network) for (successful) transmission of the transport block/PDU. In other words, the UE may cancel remaining UL repetition transmissions. In some embodiments, the indication that the UE will not transmit additional UL repetitions may be based, at least in part, on monitoring a cancellation condition, such as monitored channel quality. In some embodiments, the UE may determine, during transmission of the at least first portion of UL repetitions and prior to transmission of the indication, that the monitored cancellation condition has occurred (or obtained), e.g., monitored UL BLER (as signaled from the network to the UE) is less than an UL BLER target specified in the UL repetition configuration. In such embodiments, the indication may be based on the cancellation condition obtaining and/or occurring. In some embodiments, monitoring UL channel quality may include (or also include) monitoring one or more of UL block error rate (BLER), signal to noise ratio (SNR), or radio resource management (RRM) measurement quality. In some embodiments, the indication that the UE will not transmit additional UL repetitions may be included in a second UL repetition. In such embodiments, the indication may include (or be) a Boolean indicator. In some embodiments, the indication that the UE will not transmit additional UL repetitions may be included in one of a layer 1 uplink control information (UCI) message/signal, a medium access control (MAC) packet data unit (PDU), layer 1 schedule request (SR), or a layer 1 physical uplink control channel (PUCCH) transmission. In some embodiments, un-transmitted UL repetitions may not be included in an UL BLER calculation.

In some embodiments, the UE may receive an (explicit) indication cancelling remaining UL repetitions from the network. In some embodiments, the indication may be received prior to transmission of the second UL repetition, e.g., during and/or after transmission of at least the first portion of UL repetitions. In some embodiments, responsive to receiving the indication, the UE may cancel the remaining UL repetitions, include the second UL repetition. In some embodiments, the indication may include (or be) at least one of a new grant, a cancellation downlink control information (DCI) message/signal, or an acknowledgement transmitted on a physical hybrid-automatic repeat request indicator channel (PHICH). In some embodiments, the UE may be configured to operate in a coverage enhanced (CE) mode of operation, such as CE mode A or CE mode B. In some embodiments, the UE may be configured to operate in a non-Ce mode. In some embodiments, the new grant may include a new data indicator (NDI) with a value of 1. In some embodiments, the cancellation DCI message/signal may include an indication of the cancellation of the remaining UL repetitions.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform voice and/or data communications;
wherein the one or more processors are configured to cause the UE to:
receive, from a base station, an uplink (UL) repetition configuration associated with a transport block, wherein the UL repetition configuration specifies a number of UL repetitions required for transmission of the transport block;
transmit, to the base station, at least a first portion of UL repetitions while monitoring UL channel quality; and
transmit, after transmission of the first portion of UL repetitions, an indication that the UE will not transmit additional UL repetitions, wherein the transmission of the first portion of UL repetition does not complete the number of UL repetitions required for transmission of the transport block, wherein the indication that the UE will not transmit additional UL repetitions is included in an uplink control information (UCI) message, and wherein the indication that the UE will not transmit additional UL repetitions is based, at least in part, on the monitored UL channel quality.

2. The UE of claim 1,
wherein the UL repetition configuration includes an UL repetition cancellation condition, and wherein the one or more processors are further configured to:
determine, during transmission of at least the first portion of UL repetitions and prior to transmission of the indication, that the UL repetition cancellation condition has occurred, and wherein the indication is transmitted responsive to the UL repetition cancellation condition occurring.

3. The UE of claim 1,
wherein monitoring UL channel quality includes monitoring one or more of UL block error rate (BLER), signal to noise ratio (SNR), or radio resource management (RRM) measurement quality.

4. The UE of claim 1,
wherein un-transmitted UL repetitions are not included in a block error rate (BLER) calculation.

5. The UE of claim 1,
wherein the one or more processors are further configured to cause the UE to:
receive, during or after transmission of at least the first portion of UL repetitions and prior to transmission of the indication, a message from the base station cancelling remaining UL repetitions; and
cancel transmission of remaining UL repetitions.

6. The UE of claim 5,
wherein the indication comprises at least one of a new grant, a cancellation downlink control information (DCI) message, or an acknowledgement transmitted on a physical hybrid-automatic repeat request indicator channel (PHICH).

7. The UE of claim 6,
wherein the UE is configured to operate in a coverage enhanced (CE) mode of operation.

8. The UE of claim 6,
wherein the new grant includes a new data indicator (NDI) with a value of 1; and
wherein the cancellation DCI message includes an indication of the cancellation of the remaining UL repetitions.

9. A base station, comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform voice and/or data communications;
wherein the one or more processors are configured to cause the base station to:
  transmit, to a user equipment device (UE), an uplink (UL) repetition configuration associated with a transport block, wherein the UL repetition configuration specifies a number of UL repetitions required for transmission of the transport block;
  receive, from the UE, at least a first portion of UL repetitions; and
  receive, from the UE and after reception of the first portion of UL repetitions, an indication that the UE will not transmit additional UL repetitions, wherein the indication that the UE will not transmit additional UL repetitions is included in an uplink control information (UCI) message, and wherein the reception of the first portion of UL repetition does not complete the number of UL repetitions required for reception of the transport block.

10. The base station of claim 9,
wherein the one or more processors are further configured to cause the base station to:
  monitor channel conditions for at least a first time period; and
  reduce, based on the channel conditions, the number of UL repetitions required for transmission of the transport block; and
  transmit, to the UE, a new UL repetition configuration specifying the reduced number of UL repetitions.

11. The base station of claim 9,
wherein un-transmitted UL repetitions are not included in a block error rate (BLER) calculation.

12. A non-transitory computer readable memory medium storing program instructions executable by processing circuitry to cause a user equipment device (UE) to:
  receive, from a base station, an uplink (UL) repetition configuration associated with a transport block, wherein the UL repetition configuration specifies a number of UL repetitions required for transmission of the transport block, and wherein the UL repetition configuration includes an UL block error rate (BLER) target;
  transmit, to the base station, at least a first portion of UL repetitions while monitoring UL BLER; and
  transmit, to the base station, a second UL repetition and an indication that the UE will not transmit additional UL repetitions, wherein the indication that the UE will not transmit additional UL repetitions is included in an uplink control information (UCI) message, and wherein the second UL repetition does not complete the number of UL repetitions required for transmission of the transport block, and wherein the indication that the UE will not transmit additional UL repetitions is based, at least in part, on the monitored UL BLER being less than the UL BLER target.

13. The non-transitory computer readable memory medium of claim 12,
wherein the program instructions are further executable by processing circuitry to cause the UE to:
  receive, during or after transmission of at least the first portion of UL repetitions and prior to transmission of the second UL repetition, an indication from the base station cancelling remaining UL repetitions, wherein the indication comprises at least one of a new grant, a cancellation downlink control information (DCI) message, or an acknowledgement transmitted on a physical hybrid-automatic repeat request indicator channel (PHICH) when the UE is configured to operate in a coverage enhanced (CE) mode of operation; and
  cancel transmission of the second UL repetition.

14. The non-transitory computer readable memory medium of claim 13,
wherein the new grant includes a new data indicator (NDI) with a value of 1.

15. The non-transitory computer readable memory medium of claim 13,
wherein the cancellation DCI message includes an indication of the cancellation of the remaining UL repetitions.

16. The non-transitory computer readable memory medium of claim 12,
wherein monitoring UL channel quality includes monitoring one or more of UL block error rate (BLER), signal to noise ratio (SNR), or radio resource management (RRM) measurement quality.

17. The base station of claim 9,
wherein the one or more processors are further configured to cause the base station to:
  transmit, during or after reception of at least the first portion of UL repetitions and prior to reception of the second UL repetition, an indication cancelling remaining UL repetitions.

18. The base station of claim 17,
wherein the indication comprises at least one of a new grant, a cancellation downlink control information (DCI) message, or an acknowledgement transmitted on a physical hybrid-automatic repeat request indicator channel (PHICH) when the UE is configured to operate in a coverage enhanced (CE) mode of operation.

19. The base station of claim 18,
wherein the new grant includes a new data indicator (NDI) with a value of 1.

20. The base station of claim 18,
wherein the cancellation DCI message includes an indication of the cancellation of the remaining UL repetitions.

* * * * *